US008711845B2

(12) United States Patent
Miyata

(10) Patent No.: US 8,711,845 B2
(45) Date of Patent: Apr. 29, 2014

(54) COMMUNICATION TERMINAL DEVICE, COMMUNICATION SYSTEM, AND COMMUNICATION CONTROL METHOD

(75) Inventor: Katsuya Miyata, Kanagawa (JP)

(73) Assignee: NEC Casio Mobile Communications, Ltd., Kanagawa (JP)

( * ) Notice: Subject to any disclaimer, the term of this patent is extended or adjusted under 35 U.S.C. 154(b) by 13 days.

(21) Appl. No.: 13/095,058

(22) Filed: Apr. 27, 2011

(65) Prior Publication Data
US 2011/0268109 A1 Nov. 3, 2011

(30) Foreign Application Priority Data

Apr. 28, 2010 (JP) ................ 2010-104480

(51) Int. Cl.
H04L 12/66 (2006.01)
(52) U.S. Cl.
USPC ...................................... 370/352
(58) Field of Classification Search
USPC ......... 370/331, 259, 328, 310, 230, 329, 252, 370/352, 254, 332; 455/458, 450, 461, 442, 455/432.2, 436
See application file for complete search history.

(56) References Cited

U.S. PATENT DOCUMENTS

| 6,526,036 | B1* | 2/2003 | Uchida et al. ............... 370/342 |
| 8,023,497 | B2* | 9/2011 | Jayaram et al. .............. 370/352 |
| 8,285,279 | B2* | 10/2012 | Salkintis ................ 455/432.2 |
| 2003/0036392 | A1* | 2/2003 | Yukie ......................... 455/461 |
| 2006/0111115 | A1* | 5/2006 | Marin et al. ................ 455/442 |
| 2007/0002831 | A1* | 1/2007 | Allen et al. ................. 370/352 |
| 2008/0212524 | A1* | 9/2008 | Niwano ...................... 370/329 |
| 2008/0293426 | A1* | 11/2008 | Kim et al. ................... 455/450 |
| 2008/0316998 | A1* | 12/2008 | Procopio et al. ............ 370/352 |
| 2009/0238143 | A1* | 9/2009 | Mukherjee et al. ......... 370/331 |
| 2009/0268635 | A1* | 10/2009 | Gallagher et al. .......... 370/254 |
| 2009/0296660 | A1* | 12/2009 | Weng ......................... 370/332 |
| 2009/0316633 | A1* | 12/2009 | Kato et al. .................. 370/329 |

(Continued)

FOREIGN PATENT DOCUMENTS

| JP | 9-163450 A | 6/1997 |
| JP | 2000-175264 A | 6/2000 |

(Continued)

OTHER PUBLICATIONS

3rd Generation Partnership Project, Technical Specification Group Services and System Aspects; Circuit Switched Fallback in Evolved Packet System; Stage 2 (Release 8), 3GPP TS 23.272, Technical Specification, 2009. pp. 1-47.

Primary Examiner — Asad Nawaz
Assistant Examiner — Parth Patel
(74) Attorney, Agent, or Firm — Foley & Lardner LLP

(57) ABSTRACT

The first communication unit 101 performs data communication in a first communication mode specializing in packet communication via a first communication system A. The second communication unit 102 performs data communication in a second communication mode supporting voice communication via a second communication system B. The control unit 109 controls the first communication unit 101 and second communication unit 102. The control unit 109 controls the first communication unit 101 to perform data communication via the first communication system A until a voice communication start instruction is received. The control unit 109 determines whether to perform data communication via the second communication system B based on access control information on the second communication system B in response to the reception of a voice communication start instruction.

16 Claims, 7 Drawing Sheets

(56) References Cited

U.S. PATENT DOCUMENTS

| | | | |
|---|---|---|---|
| 2010/0208624 A1* | 8/2010 | Vikberg et al. | 370/259 |
| 2011/0080867 A1* | 4/2011 | Mildh | 370/328 |
| 2011/0080894 A1 | 4/2011 | Iwamura et al. | |
| 2011/0103277 A1* | 5/2011 | Watfa et al. | 370/310 |
| 2011/0149908 A1* | 6/2011 | Olsson et al. | 370/331 |
| 2011/0176414 A1* | 7/2011 | De Franca Lima et al. | 370/230 |
| 2012/0014269 A1* | 1/2012 | Ray et al. | 370/252 |
| 2012/0052885 A1* | 3/2012 | Zhang et al. | 455/458 |
| 2012/0172042 A1* | 7/2012 | Drevon et al. | 455/436 |

FOREIGN PATENT DOCUMENTS

| | | | | |
|---|---|---|---|---|
| JP | 2004-289421 A | 10/2004 | | |
| JP | 2006-186686 A | 7/2006 | | |
| JP | 2008-211610 A | 9/2008 | | |
| JP | 2009/267996 | * 11/2009 | | H04W 48/18 |
| JP | 2009-267996 A | 11/2009 | | |
| JP | 2009-267997 A | 11/2009 | | |
| JP | 2010-045746 A | 2/2010 | | |

* cited by examiner

COMMUNICATION TERMINAL DEVICE, COMMUNICATION SYSTEM, AND COMMUNICATION CONTROL METHOD

INCORPORATION BY REFERENCE

This application claims the benefit of Japanese Patent Application No. 2010-104480 filed on Apr. 28, 2010. The disclosure of the above Japanese Patent Application is incorporated herein by reference in its entirety.

TECHNICAL FIELD

The present invention relates to a communication terminal device, communication system, and communication control method suitable for proper communication using multiple communication modes.

BACKGROUND ART

Currently, LTE (long term evolution) has been under development as a next generation high speed radio communication mode (or next generation high speed radio communication system). LTE is a communication mode specializing in packet communication. LTE-capable radio communication terminal devices presumably utilize a conventional radio voice communication system such as W-CDMA and cdma 2000 1x for voice communication by circuit switching. Here, W-CDMA and cdma 2000 1x are radio communication systems supporting voice communication.

Here, if a radio communication terminal device is always on standby both for a radio voice communication system and for an LTE system, the power consumption during standby is increased. However, if a radio communication terminal device is always on standby only for an LTE system, it is normally disabled from receiving incoming voice calls and fails to function as a so-called "telephone." On the other hand, if a radio communication terminal device is always on standby only for a radio voice communication system, advantageous normally-on IP connectivity of LTE is wasted.

In order to resolve the above problem, LTE systems utilize a function called CS (circuit switched) Fallback. In the CS Fallback, the following procedures are executed. First, a notice of incoming voice call from a radio voice communication system is tunneled into the LTE system and transferred to the radio communication terminal device. Receiving the notice of incoming voice call, the radio communication terminal device suspends the LTE system and catches the radio voice communication system. Furthermore, the radio communication terminal device establishes line connection to the caught radio voice communication system and performs voice communication. After the voice communication is finished, the radio communication terminal device disconnects the radio voice communication system. Furthermore, the radio communication terminal device resumes the LTE system and returns to standby state in the LTE system. Similar procedures to the incoming voice processing are executed for outgoing voice processing in the CS Fall hack.

The CS Fallback reduces the power consumption compared with the case which is always on standby both for a radio voice communication system and for an LTE system. The CS Fallback is disclosed, for example, in Unexamined Japanese Patent Application KOKAI Publication No. 2009-267996 and 3GPP TS23.272 V8.3.0: Circuit Switched Fallback in Evolved Packet System; Stage 2.

However, when a radio communication terminal device suspends an LET system and catches a radio voice communication system, message transmission from the radio communication terminal device to the caught radio voice communication system may sometimes be inhibited by the access control of the caught radio voice communication system. In such a case, the radio communication terminal device wastes its power for executing suspension procedure and resumption procedure of the LTE system in spite of the fact that the voice communication is unavailable. Furthermore, in such a case, radio transmission/reception of control messages for the suspension procedure and resumption procedure lead to waste of radio resources. For this reason, there is a strong demand for less waste of power consumption and radio resources while using both of a radio voice communication system and an LTE system.

SUMMARY

The present invention is invented in view of the above circumstances and an exemplary object of the present invention is to provide a communication terminal device, communication system, and communication control method suitable for proper communication using multiple communication modes.

In order to achieve the above object, the communication terminal device according to a first exemplary aspect of the present invention includes:

a first communication unit performing data communication in a first communication mode specializing in packet communication via a first communication system;

a second communication unit performing data communication in a second communication mode supporting voice communication via a second communication system;

an instruction input unit receiving input of a voice communication start instruction; and a control unit controlling the first communication unit and the second communication unit, wherein:

the control unit controls the first communication unit to perform data communication via the first communication system until the instruction input unit receives the input of a voice communication start instruction, determines whether to perform data communication via the second communication system based on access control information on the second communication system in response to the input of a voice communication start instruction received by the instruction input unit; and controls the first communication unit to request the first communication system to execute a suspension procedure and controls the second communication unit to perform voice communication via the second communication system when it is determined to perform data communication via the second communication system.

In order to achieve the above object, the communication system according to a second exemplary aspect of the present invention is:

a communication system including a first communication system specializing in packet communication, a second communication system supporting voice communication, and a communication terminal device performing data communication via the first communication system or the second communication system, wherein:

the communication terminal device requests the first communication system to execute a suspension procedure before it performs voice communication via the second communication system, the communication terminal device requests the first communication system to execute a resumption procedure after the voice communication is finished, the first communication system holds access control information on the second communication system, the first communication system sends the access control information to the communication terminal device in response to input of a voice communication start instruction to the communication terminal device, the first communication system executes a procedure to suspend the communication terminal device when it receives a transmission procedure continuation notice from the communication terminal device, and the first communication system does not execute a procedure to suspend the communication terminal device when it receives a transmission procedure end notice from the communication terminal device.

In order to achieve the above object, the communication control method according to a third exemplary aspect of the present invention is:

a communication control method executed by a communication terminal device including a first communication means, a second communication means, an instruction input means, and a control means, including:

a first communication step in which the first communication means performs data communication in a first communication mode specializing in packet communication via a first communication system;

a second communication step in which the second communication means performs data communication in a second communication mode supporting voice communication via a second communication system;

an instruction input step in which the instruction input means receives input of a voice communication start instruction; and a control step in which the control means controls the first communication means and the second communication means, wherein:

the control step includes the following steps of:

controlling the first communication means to perform data communication via the first communication system until the instruction input means receives the input of a voice communication start instruction;

determining whether to perform data communication via the second communication system based on access control information on the second communication system in response to the input of a voice communication start instruction received by the instruction input means; and controlling the first communication means to request the first communication system to execute a suspension procedure and controlling the second communication means to perform voice communication via the second communication system when it is determined to perform data communication via the second communication system.

The present invention can provide a communication terminal device, communication system, and communication control method suitable for proper communication using multiple communication modes.

BRIEF DESCRIPTION OF THE DRAWINGS

These objects and other objects and advantages of the present invention will become more apparent upon referring the following detailed description and the accompanying drawings in which.

EXEMPLARY EMBODIMENTS

Embodiment 1

(Entire Configuration of the System)

Figure 1:
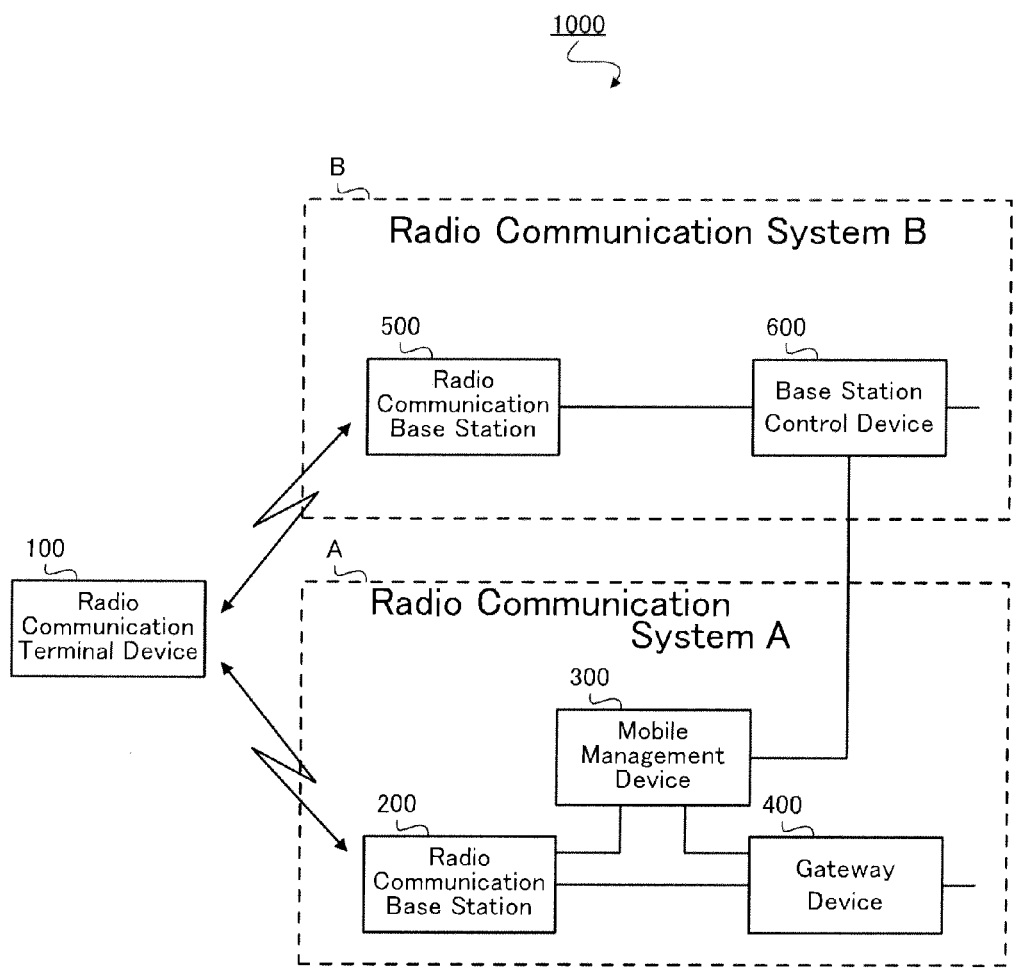
FIG. 1 is an illustration showing an exemplary entire configuration of a radio communication system according to Embodiment 1 of the present invention.

FIG. 1 is an illustration showing an exemplary entire configuration of a radio communication system 1000 according to this embodiment. The radio communication system 1000 is composed of a radio communication terminal device 100, a radio communication base station 200, a mobile management device 300, a gateway device 400, a radio communication base station 500, and a base station control device 600.

The radio communication base station 200, the mobile management device 300, and the gateway device 400 are network devices constituting a first communication system A ("the radio communication system A" hereafter). The radio communication system A can be, for example, an LTE system, HSPA system, EV-DO system, or WiMAX system, primarily providing high speed data communication service. Although this is not shown in the figures, the radio communication system A can include an authentication server, a subscriber information management server, a policy/charge control server, and so on. In this embodiment, the radio communication system A is an LTE system unless otherwise described.

An LTE system realizes communication of a wide bandwidth up to 20 MHz. An LTE system realizes up to 300 Mbps or higher communication in down communication by utilizing OFDMA (orthogonal frequency division multiple access) and MIMO (multiple input multiple output). Furthermore, an LTE system realizes up to 75 Mbps communication in up communication by utilizing SC-FDMA (single-carrier frequency division multiple access). An LTE system is specialized in packet communication.

The radio communication base station 500 and base station control device 600 are network devices constituting a second communication system B ("the radio communication system B" hereafter). The radio communication system B can be, for example, a W-CDMA system, cdma 2000 1x system, or PHS system, primarily providing voice communication service. In other words, the radio communication system B is at least a voice communication support system. However, the radio communication system B may provide not only voice communication service but also data communication service in some cases. In other words, the radio communication system B may or may not support data communication. Although this is not shown in the figures, the radio communication system B can include an authentication server, subscriber information management server, policy/charge control server, and so on.

The radio communication terminal device 100 is workable at least with the radio communication system A and radio communication system B and has capability of performing radio communication with the radio communication base stations 200 and 500. The radio communication terminal device 100 communicates with other communication devices connected to the radio communication system A, radio communication system B, or another not-shown communication system via them. Other communication devices may be a portable communication device or a fixed communication device. Furthermore, other communication devices may be a radio communication device or a wired communication device. Other communication devices can be, for example, a cell-phone, personal computer, and so on. The radio communication terminal device 100 switches communication systems to be used as to appropriate. For example, the radio communication terminal device 100 utilizes the radio communication system B when communication data are voice data and utilizes the radio communication system A when communication data are data other than voice data. For example, CS Fallback is utilized to switch to a communication system to be used.

The radio communication base station 200 wirelessly communicates with the radio communication terminal device 100 via a radio interface. For example, when the radio communication system A is an LTE system, eNB (evolved node B) corresponds to the radio communication base station 200.

The mobile management device 300 is in charge of management of position information on the radio communication terminal device 100, session management, and management of the gateway device to be connected. When the radio communication system A is an LTE system, MME (mobility management entity) corresponds to the mobile management device 300.

The gateway device 400 is in charge of data communication traffic transfer and data transfer path switching upon handover. When the radio communication system A is an LTE system, S-GW (serving gateway) corresponds to the gateway device 400.

The radio communication base station 500 wirelessly communicates with the radio communication terminal device 100 via a radio interface. For example, Node B, BTS (base transceiver station), or BS (base station) corresponds to the radio communication base station 500.

The base station control device 600 is in charge of position registration, authentication, signal transmission/reception, and handover control of the radio communication terminal device 100. For example, RNC (radio network control) or MSC (mobile switching center) corresponds to the base station control device 600.

With the base station control device 600 and the mobile management device 300 being connected, the radio communication system 1000 is configured to have mutual connectivity between the radio communication systems A and B. In FIG. 1, the base station control device 600 and mobile management device 300 are directly connected by way of example. A device such as a CS IWS (circuit switched fallback interworking solution function) can be interposed between them.

(Functional Configuration of the Radio Communication Terminal Device)

Figure 2:
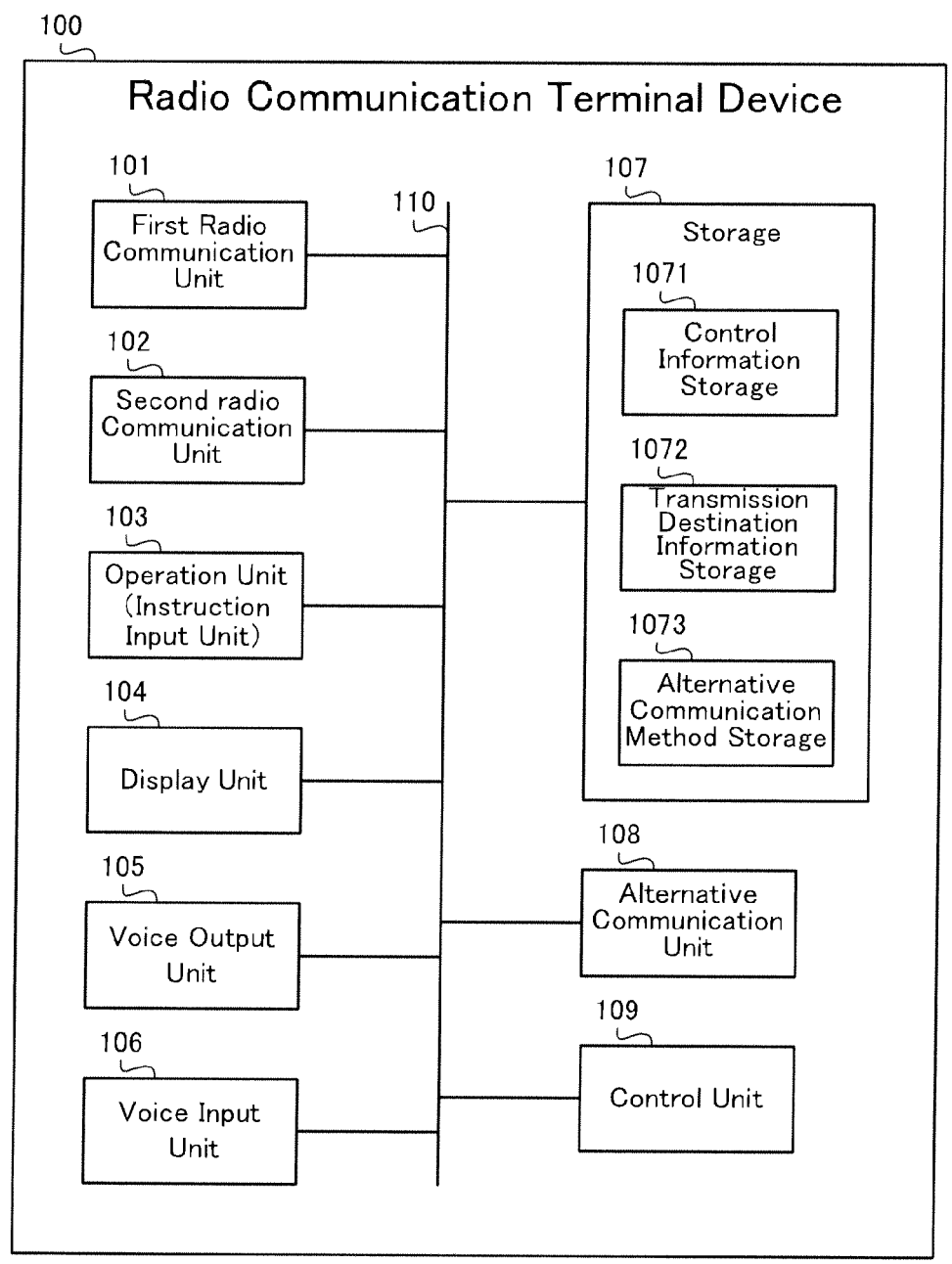
FIG. 2 is an illustration showing an exemplary functional configuration of a radio communication terminal device according to Embodiment 1.

FIG. 2 is an illustration showing an exemplary functional configuration of the radio communication terminal device 100 according to Embodiment 1.

The radio communication terminal device 100 comprises a first radio communication unit 101, a second radio communication unit 102, an operation unit 103, a display unit 104, a voice output unit 105, a voice input unit 106, a storage 107, an alternative communication unit 108, a control unit 109, and a bus 110.

The first radio communication unit 101 transmits/receives various data via the radio communication base station 200. The first radio communication unit 101 performs radio communication based on radio communication modes such as LTE, HSPA, EV-DO, and WiMAX.

The second radio communication unit 102 is in charge of voice communication and transmission/reception of various data via the radio communication base station 500. The second radio communication unit 102 performs radio communication based on radio communication modes such as W-CDMA, cdma 2000 1x, and PHS.

The operation unit 103 comprises a keyboard, a cursor key, a numeric keypad, and so on. The operation unit 103 receives input of various instructions through operation by the user and supplies operation signals to the control unit 109. Therefore, the operation unit 103 can be termed as an instruction input unit 103.

The display unit 104 is composed of a display panel such as a dot matrix type LCD (liquid crystal display) and a driver circuit. The display unit 104 displays any data (such as characters, images, and video images) under the control of the control unit 109 to present them to the user. The display unit 104 may be configured as an information presentation unit 104 presenting information to the user in a broad sense.

The voice output unit 105 comprises a speaker and a DAC (digital-analog converter). The voice output unit 105 performs, for example, D/A conversion on voice signals received from the second radio communication unit 102 and produces sound from the speaker.

The voice input unit 106 comprises a microphone and an ADC (analog-digital converter). The voice input unit 106 performs, for example, A/D conversion on voice received by the microphone upon call and supplies voice signals obtained by the A/D conversion to the second radio communication unit 102.

The storage 107 is composed of a memory installed in the radio communication terminal device 100 or a detachable external memory and stores various data. The storage 107 is composed of a RAM (random access memory), a ROM (read only memory), or a flash memory. The storage 107 stores, for example, operation control programs for the control unit 109. The storage 107 includes a control information storage 1071, a transmission destination information storage 1072, and an alternative communication method storage 1073.

The control information storage 1071 stores access control information on the radio communication system B received by the first radio communication unit 101 or the second radio communication unit 102. The access control information comprises PSIST (0-9), PSIST_EMG, ACCT_AOC_BI TMAP1 and so on, contained in access parameter messages when the radio communication system B is a cdma 2000 1x system.

The transmission destination information storage 1072 stores transmission destination information presenting the addresses of data transmission destination devices.

The alternative communication method storage 1073 stores alternative communication method information presenting communication methods other than the second radio communication unit 102.

The alternative communication unit 108 is a communication unit other than the first and second radio communication units 101 and 102, transmitting/receiving various data via a communication system not shown in FIG. 1. The alternative communication unit 108 performs communication based on any communication method.

The control unit 109 is composed of a microprocessor and so on and controls the entire radio communication terminal device 100. Furthermore, the control unit 109 acquires information on access control ("access control information" hereafter) to the radio communication base station 500 of the radio communication system B. Here, the control unit 109 may cooperate with the first radio communication unit 101 or the second radio communication unit 102 to acquire the access control information. Via the second radio communication unit 102, the control unit 109 receives the access control information sent from the radio communication base station 500. Alternatively, via the first radio communication unit 101, the control unit 109 receives the access control information transferred from the radio communication base station 500 to the radio communication base station 200 by tunneling.

The bus 110 allows mutual data transfer among the components of the radio communication terminal device 100.

(Operation of the Radio Communication Terminal Device)

Figure 3:
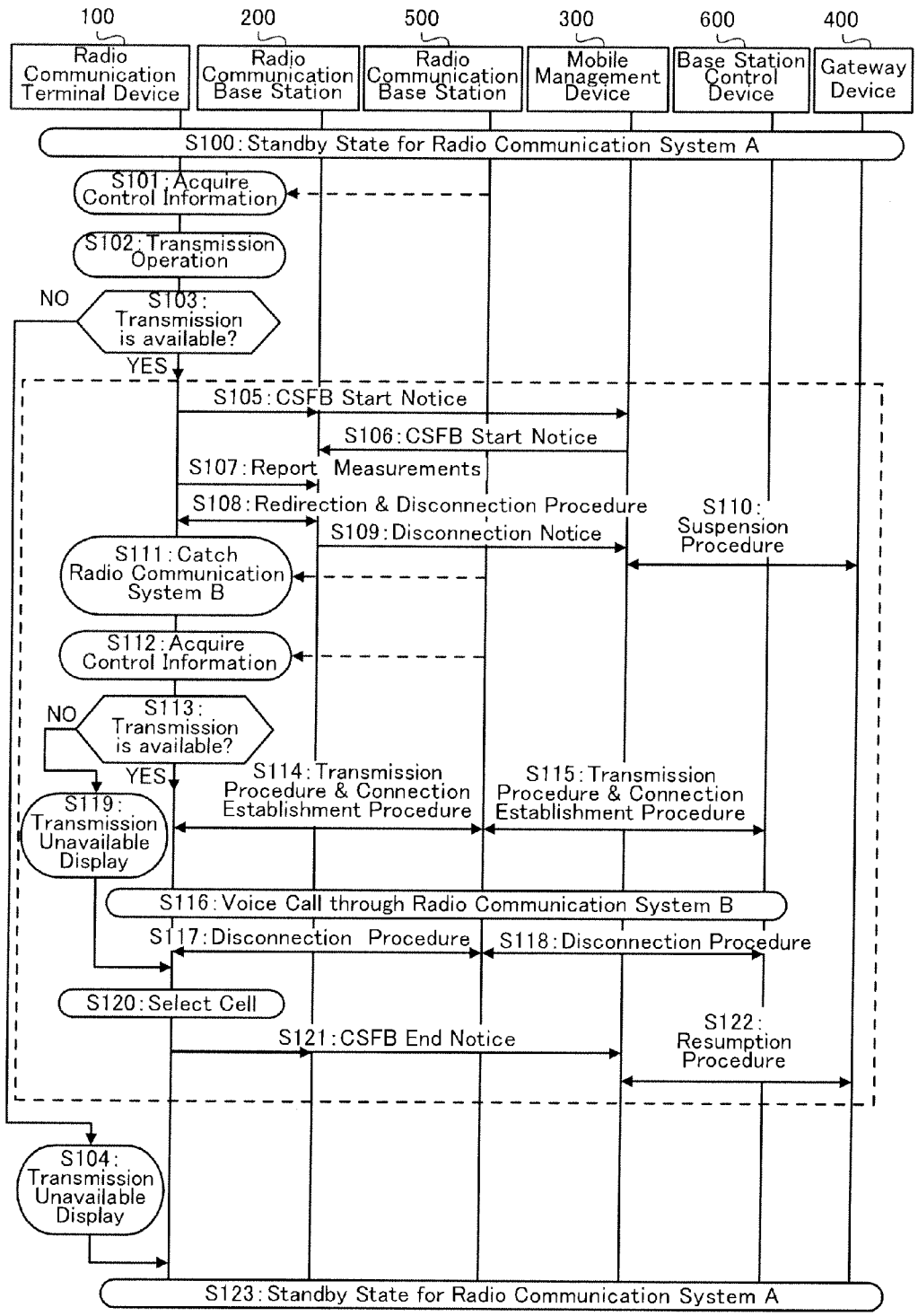
FIG. 3 is a flowchart for explaining an exemplary process executed by the radio communication system according to Embodiment 1.
Figure 4:
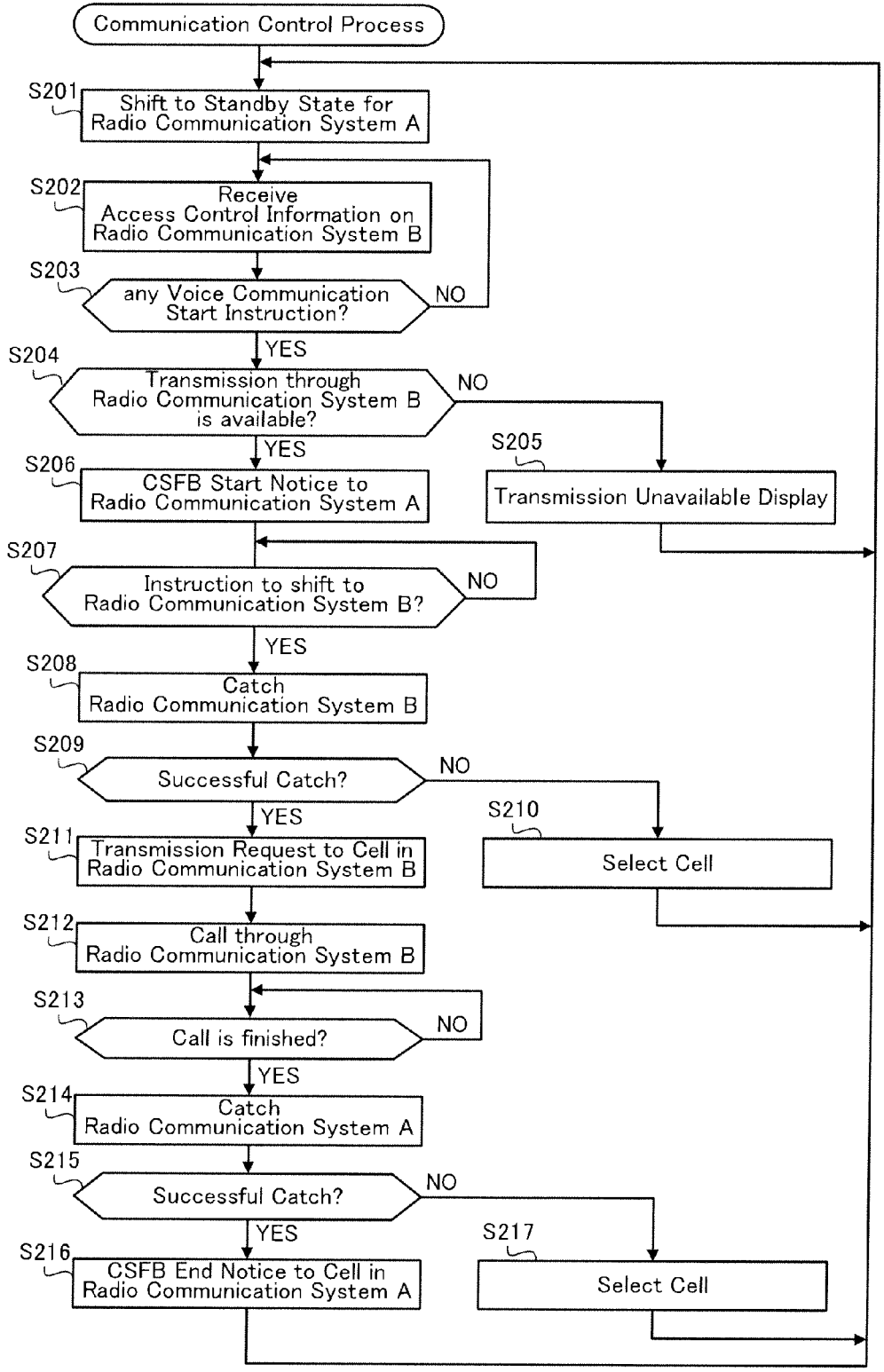
FIG. 4 is a flowchart showing an exemplary communication control process executed by the radio communication terminal device according to Embodiment 1.

Operation of the radio communication terminal device 100 according to this embodiment will be described hereafter with reference to the process flowcharts shown in FIGS. 3 and 4. The process flowcharts shown in FIGS. 3 and 4 are operation flowcharts of transmission using a CS Fallback ("CSFB" hereafter) function when the access control is enabled in the radio communication system B. The communication control process shown in FIG. 4 will be described hereafter with reference to FIG. 3 as appropriate.

When the radio communication terminal device 100 is powered on, the control unit 109 catches the radio communication system A and shifts to a standby state for the radio communication system A (Step S201, Step S100). The standby state is the state in which the radio communication terminal device 100 has synchronized with a cell (or radio base station) belonging to the radio communication system A and received system information on the radio communication system A that is notified by the cell. In other words, the standby state is a so-called "camp on" state. A cell means a communicable range; however, here, a cell means a radio base station providing a communicable range. In the standby state, the radio communication terminal device 100 may request position registration, or session or bearer establishment of a network device (the mobile management device 300 or gateway device 400) of the radio communication system A. Being normally (except for the time during voice communication) in the standby state for the radio communication system A, the radio communication terminal device 100 has merits such as a shorter start-up time for data communication to start and service initiated by the network for the radio communication terminal device 100.

In the standby state for the radio communication system A, the control unit 109 periodically acquires access control information on the radio communication system B and stores it in the control information storage 1071 (Step S202, Step S101). The access control information is contained in access information messages or system information notified by the radio communication system B. For easier understanding, the following explanation will be made on the assumption that the access control information itself is notified by the radio communication system B.

The Step S101 represents the operation in which access control information notified by the radio communication base station 500 of the radio communication system B is received as a temporal interrupt during the standby state for the radio communication system A. In the standby state for the radio communication system A, the radio communication terminal device 100 receives access control information periodically notified by the radio communication system A while access control information is notified. However, it shifts to a sleep state while no access control information is notified. In the sleep state, the power supply to unused modules such as transmission and reception circuits within the radio communication terminal device 100 is discontinued and no procedures regarding the radio communication system A are executed. Therefore, the radio communication terminal device 100 receives access control information notified by the radio communication system B while no procedures regarding the radio communication system A are executed. This reception procedure is completed in a short time so as not to affect an intermittent reception procedure during the standby for the radio communication system A. Preferably, the interval of receiving access control information notified by the radio communication system B is longer than the interval of the intermittent reception procedure during the standby for the radio communication system A (for example, several minutes to several tens of minutes). In such a configuration, the radio communication terminal device 100 is substantially in the standby state only for the radio communication system A and does not need to increase power consumption.

Alternatively, it is possible that the radio communication terminal device 100 requests the radio communication base station 500 to send access control information and, triggered by that, the radio communication base station 500 sends access control information. In the case of the radio communication terminal device 100 requesting access control information, it is possible that triggered by reception of a voice communication start instruction described later, the radio communication terminal device 100 requests the radio communication base station 500 to send access control information and, triggered by that, the radio communication base station 500 sends access control information.

As described above, in this embodiment, the access control information on the radio communication system B is directly notified by the radio communication base station 500. Here, the access control information on the radio communication system B can indirectly be notified by the radio communication base station 200 instead of directly being notified by the radio communication base station 500.

In this state, the control unit 109 determines whether there is any transmission operation by the user, in other words there is any voice communication start instruction (Step S203). The transmission operation by the user is made on the operation unit 103. If there is no voice communication start instruction (Step S203: NO), the control unit 109 returns to the procedure of Step S202. On the other hand, if there is a voice communication start instruction (Step S203: YES, Step S102), the control unit 109 performs transmission availability determination for determining whether transmission through the radio communication system B is available (Step S204, Step S103). For the transmission availability determination, the access control information on the radio communication system B stored in the control information storage 1071 in Step S202 is referred to. When a voice communication start instruction is received, transmission destination information contained in this instruction is stored in the transmission destination information storage 1072. The transmission destination information is, for example, a telephone number of the other party.

Here, the transmission availability determination of Step S204 is more specifically described.

For example, the transmission is determined to be unavailable if the access control information on the radio communication system B stored in the control information storage 1071 in Step S202 indicates total restriction, and determined to be available when the same indicates partial restriction or no restriction.

In the above determination scheme, the transmission is determined to be unavailable when the transmission through the radio communication system B is inhibited (Step S204: NO, Step S103: NO). Consequently, there is no need of a suspension procedure and a resumption procedure of the radio communication system A, which will eventually be wasted. On the other hand, the transmission is determined to be available when the transmission through the radio communication system B is not inhibited (Step S204: YES, Step S103: YES). With transmission through the radio communication system B being attempted, an existing level of successful transmission rate can be maintained.

In another scheme, the transmission can be determined to be unavailable when the above access control information indicates total restriction or partial restriction, and determined to be available when the same indicates no restriction.

In the above determination scheme, there is no need of a suspension procedure and a resumption procedure of the radio communication system A, which may possibly eventually be wasted, when the successful transmission rate is lower than usual. Then, the radio resources can further less be wasted.

In another scheme, the transmission can be determined to be unavailable when the above access control information indicates total restriction or partial restriction of a specific level or higher (for example, 80% or higher restriction), and determined to be available when the same indicates partial restriction up to the specific level or no restriction.

In the above determination scheme, there is no need of a suspension procedure and a resumption procedure of the radio communication system A, which may highly possibly eventually be wasted, when the transmission through the radio communication system B is strictly inhibited. On the other hand, when the transmission through the radio communication system B is not strictly inhibited, with transmission through the radio communication system B being attempted, an existing level of successful transmission rate can be maintained.

It is possible that the control unit 109 stores information indicating the above "specific level" in the storage 107 and the user can change it freely through operation on the operation unit 103. For example, the user enters any value ranging from 0 to 100% or selects 0%, 50%, 80%, or 100% to change it. Alternatively, the control unit 109 may automatically change the value depending on the transmission destination (the party to call). In this way, the user-friendliness is improved.

Furthermore, the transmission availability/unavailability can be determined according to control information based on the type of service or control information based on the type of the radio communication terminal device. In such a determination scheme, there is no need of a suspension procedure and a resumption procedure of the radio communication system A, which will eventually be wasted, when the transmission through the radio communication system B is inhibited. Otherwise, with transmission through the radio communication system B being attempted, an existing level of successful transmission rate can be maintained.

If the transmission is determined to be unavailable in Step S204 (Step S204: NO), it is possible to let the user select whether to transmit in spite of high probability of transmission failure, in place of the procedure of Step S205. For example, the control unit 109 cooperates with the display unit 104 to present to the user a selection screen on which the user selects whether to transmit. The control unit 109 can make reference to information indicating the selected operation received through the operation unit 103. The control unit 109 proceeds to the procedure of Step S206 when the user selects to transmit and proceeds to the procedure of Step S205 when the user selects not to transmit. In this way, the user-friendliness is improved.

Figure 5:
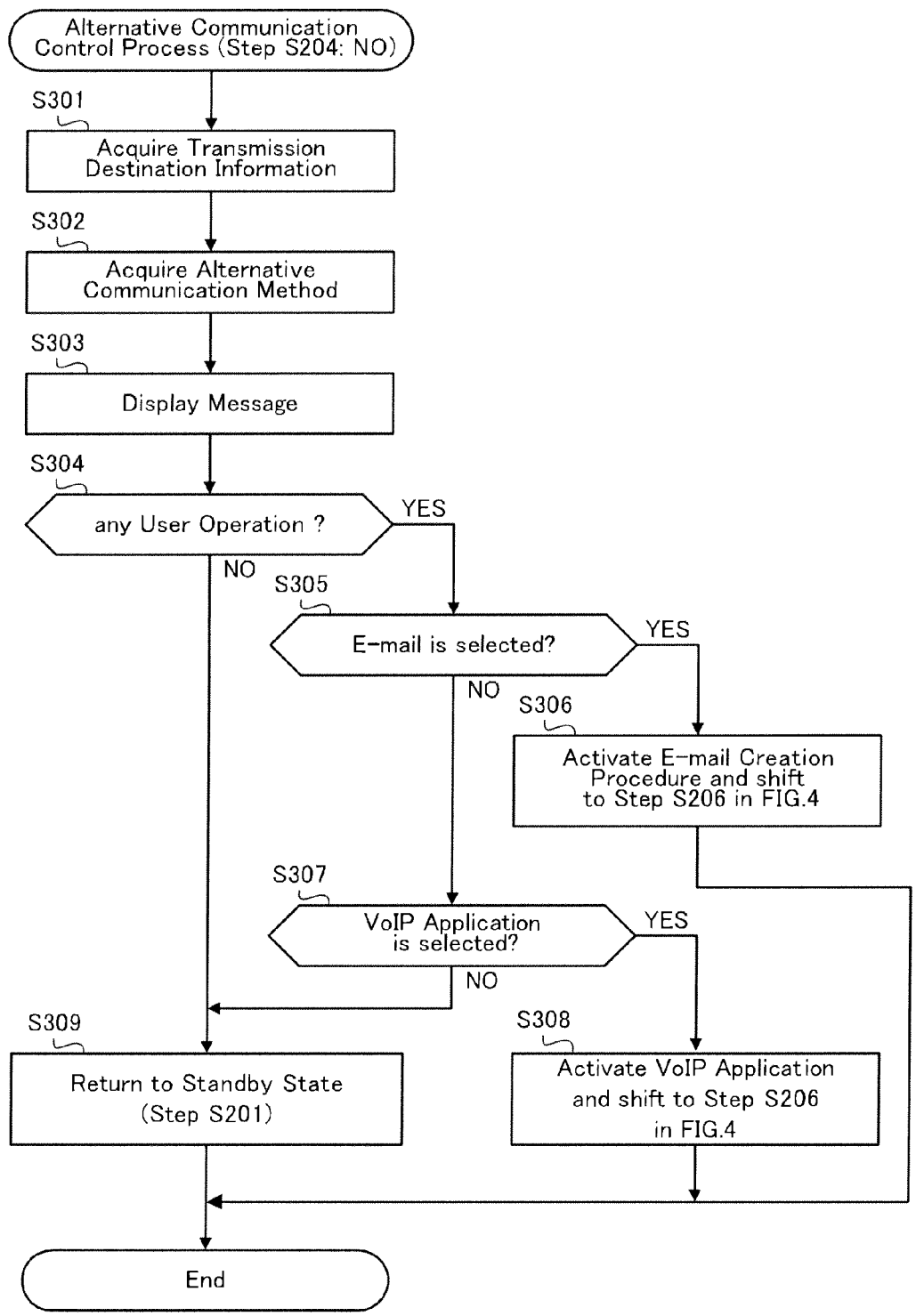
FIG. 5 is a flowchart showing an exemplary alternative communication control process executed by the radio communication terminal device according to Embodiment 1.

In other words, in the flowchart shown in FIG. 4, when the transmission is determined to be unavailable in Step S204 (Step S204: NO), the user is informed that the transmission is unavailable in Step S205. In place of the procedure of Step S205, an alternative communication control process shown in the flowchart of FIG. 5 can be executed.

In the alternative communication control process, the user is urged to use a communication means other than voice communication (for example, emailing or VoIP) for communication. In this way, the usability for the user is improved. The alternative communication control process will be described hereafter with reference to FIG. 5.

First, the control unit 109 acquires transmission destination information (Step S301). For example, the control unit 109 holds transmission destination information contained in the voice communication start instruction in Step S203 in the transmission destination information storage 1072 in advance. Then, the control unit 109 reads the transmission destination information in Step S301. Furthermore, the control unit 109 makes reference to an address book stored in the storage 107 and reads other transmission destination information related to the transmission destination indicated by the transmission destination information. For example, when a telephone number of a user A is stored in the transmission destination information storage 1072, the control unit 109 makes reference to the address book and acquires the email address or VoIP communication telephone number of the user A.

Then, the control unit 109 reads alternative communication method information presenting communication methods that can be an alternative of voice communication (Step S302). In other words, the control unit 109 reads alternative communication method information held in the alternative communication method storage 1073 in advance.

Then, the control unit 109 makes reference to the alternative communication method information read in Step S302 and displays on the display unit 104 a message urging user operation (Step S303). For example, a message reading "Connection for voice communication is failed. Do you want to email?" or "Connection for voice communication is failed. Do you want to try another means? (1) e-mail, (2) VoIP, (3) end" is displayed. The user operation is performed, for example, on the operation unit 103.

The control unit 109 determines whether there is any user operation (Step S304). If there is any user operation (Step S304: YES), the control unit 109 determines whether e-mail is selected (Step S305). If e-mail is selected (Step S305: YES), the control unit 109 activates an e-mail creation procedure (Step S306) and shifts to the procedure of Step S206 in FIG. 4. For activating the e-mail creation procedure, the control unit 109 sets the transmission destination information (e-mail address in this case) acquired in Step S301 as the transmission destination address.

On the other hand, if e-mail is not selected (Step S305: NO), the control unit 109 determines whether a VoIP application is selected (Step S307). If a VoIP application is selected (Step S307: YES), the control unit 109 activates the VoIP application (Step S308) and shifts to the procedure of Step S206. For activating the VoIP application, the control unit 109 sets the transmission destination information (a VoIP communication telephone number in this case) acquired in Step S301 as the telephone number of the other party. The e-mail transmission in Step S306 or the telephone call in Step S308 is executed by the control unit 109 in cooperation with the alternative communication unit 108.

On the other hand, if there is no user operation (Step S304: NO) and a VoIP application is not selected (Step S307: NO), the control unit 109 returns to the procedure of Step S201 (to the standby state) with no further procedure.

The set of steps S305 and S306 and the set of steps S307 and S308 can be executed in the reversed order.

Returning to FIG. 4, if the transmission is determined to be unavailable (Step S204: NO, Step S103: NO), the control unit 109 informs the user that the transmission is unavailable (Step S205, Step S104) and returns to the procedure of Step S201. For example, the control unit 109 displays on the display unit 104 a message indicating that the transmission is unavailable or produces a specific sound or warning sound from the voice output unit 105 so as to inform the user accordingly.

If the transmission is determined to be available (Step S204: YES, Step S103: YES), the control unit 109 sends a CSFB start notice to the radio communication system A (Step S206). More specifically, the control unit 109 sends a CSFB start notice to the mobile management device 300 via the radio communication base station 200 (Step S105). On the other hand, the mobile management device 300 sends a CSFB start notice to the radio communication base station 200 (Step S106). Furthermore, the control unit 109 measures the reception state of the standby cell and the reception states of neighboring cells and reports the results to the radio communication base station 200 (Step S107).

The reception state refers to an RSSI (received signal strength indicator), RSRP (reference signal received power), RSRQ (reference signal received quantity), or Ec/Io (the ratio of pilot signal received power to total signal received power). Here, the neighboring cells to be measured refer to the cells belonging to the radio communication system B supporting voice communication. The measuring and reporting of the results (measuring results report) can be triggered by voice transmission operation by the user or started routinely regardless of voice transmission operation by the user.

Receiving the measuring results report sent from the radio communication terminal device 100, the radio communication base station 200 informs the radio communication terminal device 100 of instruction of redirection to the radio communication system B and disconnection instruction and the radio communication terminal device 100 and radio communication base station 200 execute a disconnection procedure (Step S108). The redirection destination frequency band and channel and redirection timing are determined by the radio communication base station 200 according to the contents of the measuring results report. In the disconnection procedure, the radio communication terminal device 100 and radio communication base station 200 each release the radio resources reserved For radio communication between them and delete related management information. They may exchange control messages if necessary.

After completing the disconnection procedure, the radio communication base station 200 sends a disconnection notice to the mobile management device 300 (Step S109). Receiving the disconnection notice, the mobile management device 300 executes suspension procedure with the gateway device 400 (Step S110). In the suspension procedure, the mobile management device 300 and gateway device 400 release or halt the communication resources reserved for transferring data to the radio communication terminal device 100 in part and delete related management information in part. They may exchange control messages if necessary. The buffering function for data to the radio communication terminal device 100 may be enabled. In any case, here, the communication resources and management information is not totally released or deleted so that the communication can resume in a short time upon subsequent resumption procedure (Step S122).

After completing the procedure of Step 206, the control unit 109 determines whether there is any instruction to shift to the radio communication system B (Step S207). An instruction to shift to the radio communication system B is given, for example, by the user through the operation unit 103. If there is no instruction to shift to the radio communication system B (Step S207: NO), the control unit 109 returns to the procedure of Step S207. On the other hand, if there is an instruction to shift to the radio communication system B (Step S207: YES), the control unit 109 executes a procedure to catch the radio communication system B (Step S208, Step S111). In doing so, the control unit 109 searches all cells in the radio communication system B or follows the redirection instruction in Step S108 to select a radio communication base station 500 to catch. The Step S112 in FIG. 3 will be described later.

Then, the control unit 109 determines whether a cell in the radio communication system B is successfully caught, in other words whether the transmission is available (Step S209, Step S113). In the case of failing to catch a cell (Step S209: NO, Step S113: NO), the control unit 109 selects a new cell in the radio communication system A (Step S210, Step S120) and returns to the procedure of Step S201. As in Step S205 (Step S104), the user may be informed that the transmission is unavailable (Step S119). For example, prior to the procedure of Step S210, the control unit 109 displays on the display unit 104 a massage indicating that the transmission is unavailable or produces a specific sound or warning sound from the voice output unit 105 to inform the user accordingly. Then, the resumption process of Steps 120 to 122 is executed and the radio communication terminal device 100 becomes in the standby state for the radio communication system A (Step S201, Step S123).

On the other hand, if a cell is successfully caught, in other words the transmission is available (Step S209: YES, Step S113: YES), the control unit 109 sends a transmission request to the cell in the radio communication system B (Step S211).

More specifically, the control unit 109 executes a transmission procedure and a connection establishing procedure with the cell (Step S114). On the other hand, the radio communication base station 500 executes a transmission procedure and a connection establishing procedure with the base station control device 600 (Step S115). After completing the procedures of Steps 114 and 115, the radio communication terminal device 100 is ready for voice communication on the radio communication system B (Step S116).

Here, if the caught cell is different from the cell of which the access control information is acquired in Step S202 (Step S101), prior to sending a transmission request, the control unit 109 receives the access control information notified by that cell and stores it in the control information storage 1071 (Step S112). If the caught cell is the same cell as the one of which the access control information is acquired in Step S202 (Step S101), the procedure of Step 112 can be skipped. In this way, the processing time can be saved. Furthermore, for sending a transmission request, the control unit 109 makes reference to the access control information stored in the control information storage 1071 and executes a corresponding control procedure (determination procedure) (Step S113). In other words, the control unit 109 determines whether it is allowed to send a transmission request (connection establishment request) message to the radio communication base station 500 based on the acquired access control information.

Here, the access control indicated by the access control information is described. One type of access control is persistence control. Persistence control inhibits the access to the radio communication base station 500 at a specific probability. More specifically, in persistence control, a random number is produced and the produced random number is compared with a given value (threshold). With the number being greater/lower than the threshold, acceptance/rejection is granted (this is called the persistence test). In the case of acceptance, the transmission is determined to be available. On the other hand, in the case of rejection, the transmission is determined to be unavailable. According to the rate of inhibiting the access, or the threshold, it is called N % restriction. A hundred percent restriction is also called total restriction and the access to the radio communication base station 500 is inhibited. Restriction other than 100% restriction is called partial restriction.

Another type of access control imposes restriction/no restriction control depending on the type of service. For example, in some control schemes, no access restriction is imposed on emergency call transmission and access restriction (total or partial restriction) is imposed on other transmission. In other control schemes, no access restriction is imposed on transmission for data communication and access restriction (total or partial restriction) is imposed on transmission for voice communication. The transmission is determined to be available in the case of no restriction. The transmission is determined to be unavailable in the case of total restriction. It is determined whether the transmission is available/unavailable, for example, by persistence control as described above in the case of partial restriction.

Another type of access control imposes restriction/no restriction depending on the type of the radio communication terminal device. For example, no access restriction is imposed on transmission from radio communication terminal devices in particular applications such as police activity and fire fighting and access restriction (total or partial restriction) is imposed on transmission from general radio communication terminal devices. The transmission is determined to be available in the case of no restriction. The transmission is determined to be unavailable in the case of total restriction. It is determined whether the transmission is available/unavailable, for example, by persistence control as described above in the case of partial restriction.

After executing the procedure of Step S211, the control unit 109 puts the radio communication terminal device 100 in call service via the radio communication system B (Step S212, Step S116).

After completing the voice call, the control unit 109 executes a disconnection procedure from the radio communication base station 500 (Step S117). On the other hand, the radio communication base station 500 executes a disconnection procedure from the base station control device 600 (Step S118). In the radio communication system B, basically, the radio communication base station 500 and base station control device 600 are provided with necessary communication resources in accordance with the reserved radio resources between the radio communication terminal device 100 and radio communication base station 500. Therefore, the radio communication system B basically are not provided with functions of suspension and resumption that leave communication resources only in the radio communication base station 500 and base station control device 600.

Then, the control unit 109 determines whether the call through the radio communication system B is finished (Step S213). If the call is finished (Step S213: YES), the control unit 109 executes a procedure to catch the radio communication system A (Step S214). More specifically, the control unit 109 searches cells in the radio communication system A and selects a standby cell (Step S120).

Then, the control unit 109 determines whether any cell in the radio communication system A is successfully caught (Step S215). If a cell is successfully caught (Step S215: YES), the control unit 109 sends a CSFB end notice to the cell (Step S216). More specifically, the control unit 109 sends a CSFB end notice to the mobile management device 300 via the radio communication base station 200 of the selected cell (Step S121). On the other hand, receiving the CSFB end notice, the mobile management device 300 executes a resumption procedure with the gateway device 400 (Step S122).

In the resumption procedure, the mobile management device 300 and gateway device 400 regain and resume the communication resources that have been suspended or halted in Step S110 and reestablish the management information that has been deleted in part. They exchange control messages if necessary. Furthermore, the mobile management device 300 and gateway device 400 may start to transfer to the radio communication terminal device 100 data that has been buffered for the radio communication terminal device 100. In any case, here, it is unnecessary to regain communication resources and establish management information from the very beginning, whereby the communication can resume in a short time.

After completing the procedure of Step S216, the control unit 109 returns to the standby state for the radio communication system A (Step S201, Step S123, Step S100). On the other hand, in the case of failing to catch a cell (Step S215: NO), the control unit 109 selects a new cell in all radio communication systems (Step S217). Here, if the radio communication system A is caught, the control unit 109 returns to the procedure of Step S201. If the radio communication system A is not caught, the control unit 109 executes a procedure to catch the radio communication system B or an outside-the-range sleep procedure (not shown in FIG. 3 and FIG. 4).

The procedures enclosed by the broken lines in FIG. 3 (the procedures of Steps S105 to S122) basically comply with the prior art control algorithm. Therefore, the above communication control process advantageously requires very little change in the prior art control algorithm.

As described above, the radio communication system A is not immediately suspended upon voice transmission operation. First, the access information on the radio communication system B is checked and it is confirmed that the access restriction level is lower than a given level. Then, the radio communication system A is suspended. In this way, the procedures of Steps S105 to S110 and S120 to S122 as shown in FIG. 3 may not need to be executed, as required in the prior art. Then, the power consumption of a radio communication terminal device can be reduced for that. Furthermore, the radio resources are less wasted and more efficiently used.

The radio communication system 1000 according to this embodiment can less waste power consumption and radio resources while utilizing both a radio voice communication system and an LTE system.

Furthermore, in this embodiment, the access control information on the radio communication system B is directly notified from the radio communication base station 500. In this way, there is no need of transferring the access control information from the radio communication base station 500 to the radio communication base station 200 in advance. In other words, the communication traffic and processing time is reduced.

On the other hand, when the access control information on the radio communication system B is indirectly notified from the radio communication base station 200, the radio communication terminal device 100 can acquire the access control information on the radio communication system B directly from the standby radio communication system A. In this way, the processing time and workload for the radio communication terminal device 100 to receive the access control information are reduced.

Furthermore, in this embodiment, the access control information is periodically acquired before a voice communication start instruction is received. Then, the determination procedure is immediately executed.

On the other hand, the access control information can be acquired after a voice communication start instruction is received. In such a case, the workload for periodically acquiring the access control information is eliminated, whereby the processing time and workload are reduced.

Furthermore, in this embodiment, when the probability indicated by the access control information exceeds a given threshold, the transmission is determined to be available. In such a case, with the given threshold being adjusted as appropriate, risk adjustment can be done between the risk of increasing wasted power consumption and radio resources, and the risk of giving up the transmission in spite of the transmission being available.

Furthermore, in this embodiment, the transmission can be determined to be available when the access control information does not inhibit the access. In such a case, the risk of increasing wasted power consumption or radio resources is reduced.

Furthermore, in this embodiment, even if the radio communication system B is unavailable, communication by an alternative communication means is available upon selection of the user.

Embodiment 2

Figure 6:
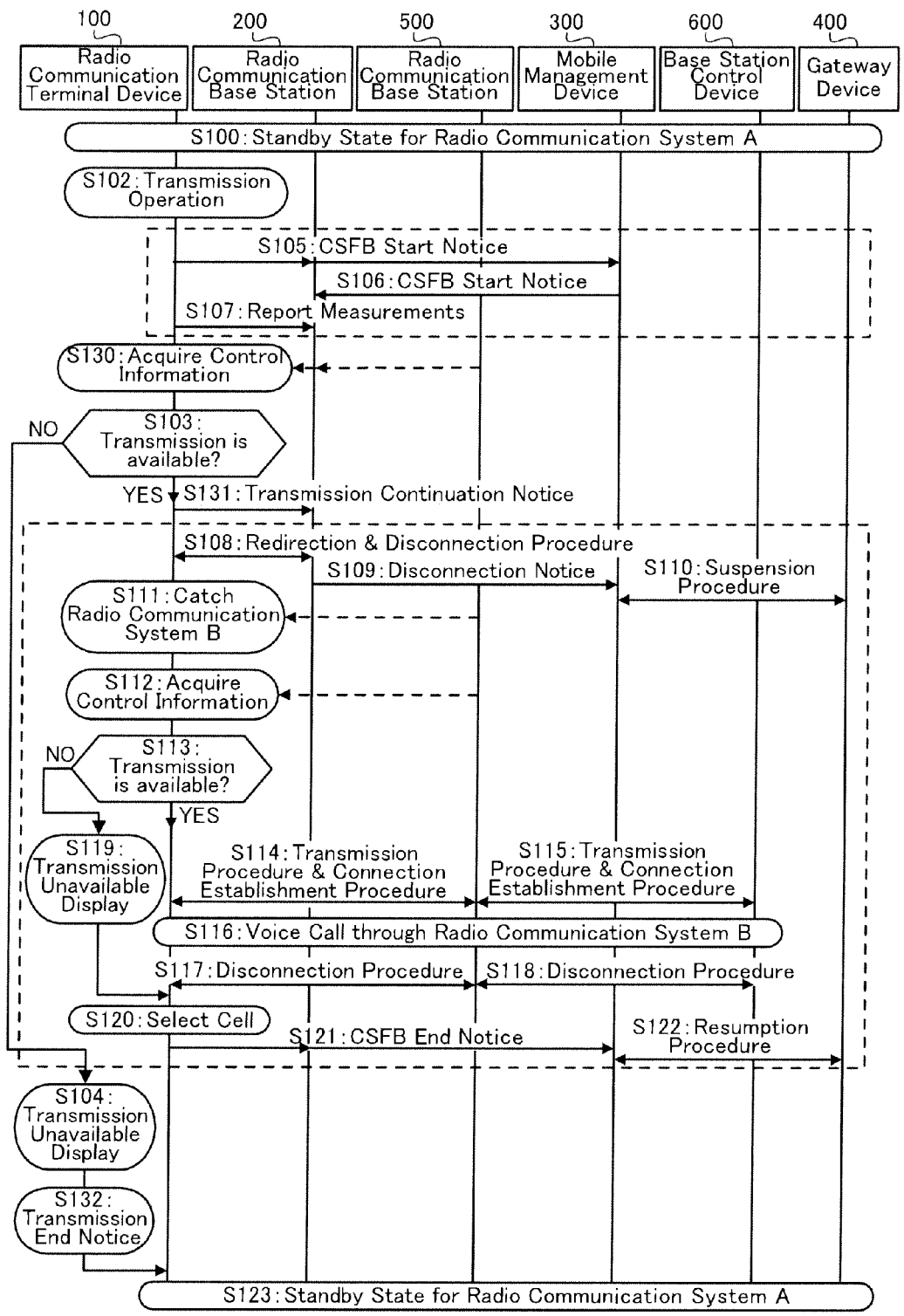
FIG. 6 is a flowchart for explaining an exemplary process executed by a radio communication system according to Embodiment 2.
Figure 7:
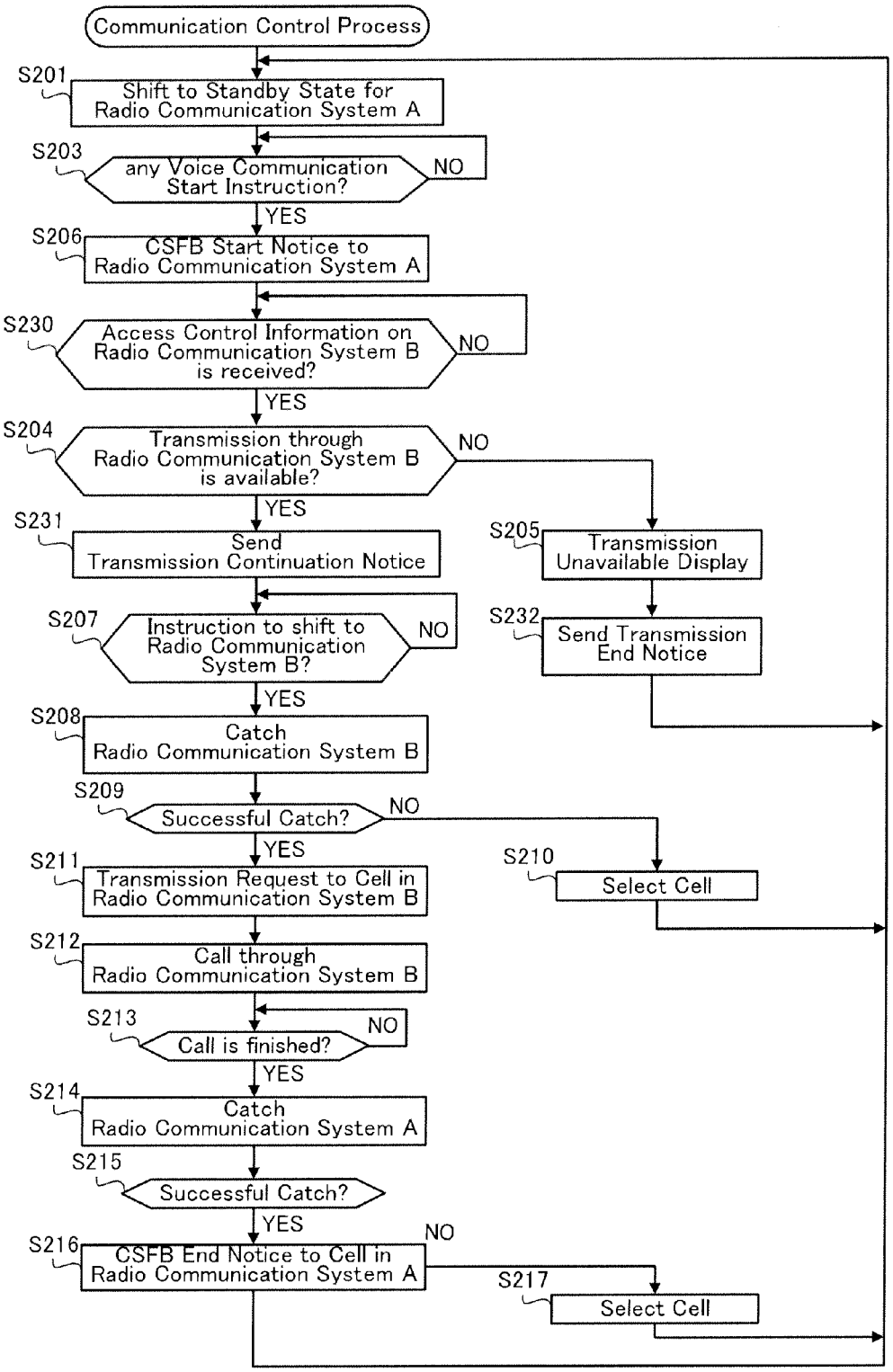
FIG. 7 is a flowchart showing an exemplary communication control process executed by a radio communication terminal device according to Embodiment 2.

Operation of the radio communication terminal device 100 according to Embodiment 2 will be described hereafter with reference to the process flowcharts shown in FIGS. 6 and 7. The process flowcharts of this embodiment is almost the same as of FIGS. 3 and 4 and the procedures of the same contents as those in FIGS. 3 and 4 are referred to by the same reference numbers.

When the radio communication terminal device 100 is powered on, the control unit 109 catches the radio communication system A and shifts to the standby state for the radio communication system A (Step S201, Step S100).

After completing the procedure of Step S201, the control unit 109 determines whether there is any voice communication start instruction (Step S203). If there is no voice communication start instruction (Step S203: NO), the control unit 109 returns to the procedure of Step S203. On the other hand, if there is a voice communication start instruction (Step S203: YES), the control unit 109 executes a transmission operation (Step S102) in which a CSFB start notice is sent to the radio communication system A (Step S206). The transmission operation (Step S102) is more specifically described as follows. The control unit 109 sends a CSFB start notice to the mobile management device 300 via the radio communication base station 200 (Step S105). On the other hand, the mobile management device 300 sends a CSFB start notice to the radio communication base station 200 (Step S106). Furthermore, the control unit 109 measures the reception state of the standby cell and the reception states of neighboring cells and reports the results to the radio communication base station 200 (Step S107).

Then, in response to "the report on the reception state of the standby cell and the reception states of neighboring cells" sent by the radio communication terminal device 100, the control unit 109 determines whether the access control information on the radio communication system B sent from the radio communication base station 200 is received (Step S230). If the access control information is not received (Step S230: NO), the control unit 109 returns to the procedure of Step S230. On the other hand, if the access control information is received (Step 130) (Step S230: YES), the control unit 109 stores the received access control information in the storage 107 and determines whether the transmission through the radio communication system B is available (S204, Step S103).

The Step S130 represents the operation in which the access control information notified by the radio communication base station 500 of the radio communication system B is transferred to the radio communication base station 200 of the radio communication system A by tunneling and the radio communication terminal device 100 receives the access control information from the radio communication base station 200. For example, if the radio communication system A is an LTE system, messages of System Information Block Type 6, System Information Block Type 7, and System Information Block Type 8 notifying system information on other radio communication systems, and DL Information Transfer messages tunneling control messages of other radio communication systems to transfer them to radio communication terminal devices can be used.

The Step S130 can be a procedure in which the radio communication terminal device 100 requests the radio communication base station 200 to send access control information and, triggered by that, the radio communication base station 200 sends access control information. When the radio communication terminal device 100 makes a request for access control information, the Step S130 can be a procedure in which triggered by reception of a voice communication start instruction described later, the radio communication terminal device 100 requests the radio communication base station 200 to send access control information and, triggered by that, the radio communication base station 200 sends access control information.

As described above, in this embodiment, the access control information on the radio communication system B is indirectly notified from the radio communication base station 200, not directly notified from the radio communication base station 500.

If the transmission is determined to be unavailable (Step S204: NO, Step S103: NO), the control unit 109 informs the user that the transmission is unavailable (Step S205, Step S104), sends a message, indicating that the transmission procedure will end, to the radio communication base station 200 (Step S232, Step S132), and returns to the procedure of Step S201. Receiving the message sent in Step S232, the radio communication base station 200 does not execute the subsequent procedures to suspend the radio communication system A. Here, Steps 205 and 232 can be executed in the reversed order. It is also possible that the control unit 109 sends no reply in Step S232 and, on the other hand, the radio communication base station 200 monitors reception timeout and ends the transmission process if it does not receive any message within a given time.

On the other hand, if the transmission is determined to be available (Step S204: YES, Step S103: YES), the control unit 109 sends a message indicating that the transmission procedure will continue to the radio communication system A (Step S231, Step S131). Then, the procedures of Steps S108 to S110 are executed. Then, the control unit 109 determines whether there is any instruction to shift to the radio communication system B (Step S207). If there is no instruction to shift to the radio communication system B (Step S207: NO), the control unit 109 returns to the procedure of Step S207. On the other hand, if there is an instruction to shift to the radio communication system B (Step S207: YES), the control unit 109 executes the procedure to catch the radio communication system B (Step S208, Step S111). In doing so, the control unit 109 searches all cells in the radio communication system B and selects a radio communication base station 500 to catch in accordance with the redirection instruction in Step S108.

Then, the control unit 109 determines whether any cell in the radio communication system B is successfully caught or the transmission is available (Step S209, Step S113). In the case of failing to catch a cell (Step S209: NO, Step S113: NO), the control unit 109 selects a new cell in the radio communication system A (Step S210, Step S120) and returns to the procedure of Step S201. Here, the control unit 109 can present a massage indicating that the transmission is unavailable to the user (Step 119).

On the other hand, if a cell is successfully caught (Step S209: YES, Step S113: YES), the control unit 109 sends a transmission request to the cell in the radio communication system B (Step S211). Then, the procedures of Steps S114 and S115 are executed.

After executing the procedure of Step S211, the control unit 109 puts the radio communication terminal device 100 in the call state via the radio communication system B (Step S212, Step S116).

Then, the control unit 109 determines whether the call through the radio communication system B is finished (Step S213). If the call is not finished (Step S213: NO), the control unit 109 returns to the procedure of Step S213. On the other hand, if the call is finished (Step S213: YES), the control unit 109 executes the procedure to catch the radio communication system A (Step S214).

Then, the control unit 109 determines whether any cell in the radio communication system A is successfully caught (Step S215). If a cell is successfully caught (Step S215: YES), the control unit 109 sends a CSFB end notice to the cell (Step S216). More specifically, the control unit 109 sends a CSFB end notice to the mobile management device 300 via the radio communication base station 200 of the cell selected in Step S120 (Step S121). On the other hand, receiving the CSFB end notice, the mobile management device 300 executes the procedure to resume the gateway device 400 (Step S122).

After completing the procedure of Step S216, the control unit 109 returns to the standby state for the radio communication system A (Step S201, Step S123, Step S100). On the other hand, in the case of failing to catch a cell, the control unit 109 selects a new cell in all radio communication systems (Step S217). Here, if the radio communication system A is caught, the control unit 109 returns to the procedure of Step S201. If the radio communication system A is not caught, the control unit 109 executes the procedure to catch the radio communication system 13 and executes an outside-the-range sleep procedure (not shown in FIG. 6 and FIG. 7).

As described above, the radio communication terminal device 100 does not immediately suspend the radio communication system A upon voice transmission operation. First, the access information on the radio communication system B is checked and it is confirmed that the access restriction level is lower than a given level. Then, the radio communication system A is suspended. In this way, the procedures of Steps S108 to S110 and S120 to S122 in FIG. 6 may not need to be executed, as required in the prior art. Then, the power consumption of the radio communication terminal device 100 can be reduced. Furthermore, the radio resources are less wasted and more efficiently used.

The radio communication system 1000 according to this embodiment can less waste power consumption and radio resources while utilizing both a radio voice communication system and an LTE system.

Furthermore, in this embodiment, the communication system used for data communication among the radio communication system A, radio communication system B, and radio communication terminal device 100 is properly switched using the CS Fallback function.

Modified Embodiment

The present invention is not confined to the above embodiments.

In the above embodiments, the communication terminal device is a radio communication terminal device 100 and the system connected to the communication terminal device is a radio communication system 1000 by way of example. However, the present invention is not confined to them. The present invention is applicable to a communication system including wired communication systems. In such a case, the radio communication system 1000 is replaced by a communication system 1000 including wired communication systems and its components consist of both radio and wired components. For example, the radio communication system A is replaced by a first communication system A, the radio communication system B is replaced by a second communication system B, and the radio communication terminal device 100 is replaced by a communication terminal device 100, the first radio communication unit 101 and second radio communication unit 102 of the radio communication terminal device 100 are replaced by a first communication unit 101 and a second communication unit 102 of the communication terminal device 100, respectively.

The communication terminal device according to the present invention can be realized not only by a dedicated system but also by a conventional computer system. For example, programs for executing the above operations can be stored and distributed in a computer-readable recording medium such as a flexible disk, CD-ROM (compact disk read-only memory), DVD (digital versatile disk), and MO (magneto optical disk) and installed on a computer, whereby a communication terminal device executing the above procedures can be configured.

Furthermore, the programs can be stored in a disk device of a server unit on the Internet and, for example, superimposed on carrier waves and downloaded to a computer.

The above embodiments are given as specific embodiments of the present invention and do not limit the technical scope of the present invention. The present invention can be realized with any change, application, and modification within the scope of the technical idea described in the scope of claims.

The above embodiments are partly or entirely described as in the following supplementary notes, but not restricted thereto.

(Supplementary Note 1)

A communication terminal device (100) including:

a first communication unit (101) performing data communication in a first communication mode specializing in packet communication via a first communication system (A);

a second communication unit (102) performing data communication in a second communication mode supporting voice communication via a second communication system (B);

an instruction input unit (103) receiving input of a voice communication start instruction; and a control unit (109) controlling the first communication unit (101) and the second communication unit (102), wherein:

the control unit (109)

controls the first communication unit (101) to perform data communication via the first communication system (A) until the instruction input unit (103) receives the input of a voice communication start instruction, determines whether to perform data communication via the second communication system (B) based on access control information on the second communication system (B) in response to the input of a voice communication start instruction received by the instruction input unit (103); and controls the first communication unit (101) to request the first communication system (A) to execute a suspension procedure and controls the second communication unit (102) to perform voice communication via the second communication system (B) when it is determined to perform data communication via the second communication system (B).

(Supplementary Note 2)

The communication terminal device (100) according to Supplementary note 1, wherein:

the access control information is information contained in the system information of the second communication system (B) notified by the second communication system (B), and the control unit (109) controls the second communication unit (102) to receive the access control information.

(Supplementary Note 3)

The communication terminal device (100) according to Supplementary note 1, wherein:

the access control information is information contained in the system information of the second communication system (B) notified by the first communication system (A), and the control unit (109) controls the first communication unit (101) to receive the access control information.

(Supplementary Note 4)

The communication terminal device (100) according to any one of Supplementary note 1 to 3, wherein the control unit (109) acquires the access control information before the instruction input unit (103) receives the input of a voice communication start instruction.

(Supplementary Note 5)

The communication terminal device (100) according to any one of Supplementary note 1 to 3, wherein the control unit (109) acquires the access control information after the instruction input unit (103) receives the input of a voice communication start instruction.

(Supplementary Note 6)

The communication terminal device (100) according to any one of Supplementary note 1 to 5, wherein:

the access control information is information indicating the probability of access to be accepted to the second communication system (B), and the control unit (109) determines to perform data communication via the second communication system (B) when the probability indicated by the access control information exceeds a given threshold.

(Supplementary Note 7)

The communication terminal device (100) according to any one of Supplementary note 1 to 5, wherein:

the access control information is information indicating whether the access to the second communication system (B) is inhibited, and the control unit (109) determines to perform in data communication via the second communication system (B) when the access control information indicates that the access to the second communication system (B) is not inhibited.

(Supplementary Note 8)

The communication terminal device (100) according to any one of Supplementary note 1 to 7, further including an information presentation unit (104) presenting information for selecting whether to perform voice communication by data communication other than data communication via the second communication system (B) when the control unit (109) determines not to perform data communication via the second communication system (B), wherein:

the instruction input unit (103) further receives input to specify whether to perform voice communication by data communication other than data communication via the second communication system (B).

(Supplementary Note 9)

A communication terminal device (100) including:

a first communication means (101) performing data communication in a first communication mode specializing in packet communication via a first communication system (A);

a second communication means (102) performing data communication in a second communication mode supporting voice communication via a second communication system (B);

an instruction input means (103) receiving input of a voice communication start instruction; and a control means (109) controlling the first communication means (101) and the second communication means (102), wherein:

the control means (109)

controls the first communication means (101) to perform data communication via the first communication system (A) until the instruction input means (103) receives the input of a voice communication start instruction, determines whether to perform data communication via the second communication system (B) based on access control information on the second communication system (B) in response to the input of a voice communication start instruction received by the instruction input means (103); and controls the first communication means (101) to request the first communication system (A) to execute a suspension procedure and controls the second communication means (102) to perform voice communication via the second communication system (B) when it is determined to perform data communication via the second communication system (B).

(Supplementary Note 10)

A communication system (1000) including a first communication system (A) specializing in packet communication, a second communication system (B) supporting voice communication, and a communication terminal device (100) performing data communication via the first communication system (A) or the second communication system (B), wherein:

the communication terminal device (100) requests the first communication system (A) to execute a suspension procedure before it performs voice communication via the second communication system (B), the communication terminal device (100) requests the first communication system (A) to execute a resumption procedure after the voice communication is finished, the first communication system (A) holds access control information on the second communication system (B), the first communication system (A) sends the access control information to the communication terminal device (100) in response to input of a voice communication start instruction to the communication terminal device (100), the first communication system (A) executes a procedure to suspend the communication terminal device (100) when it receives a transmission procedure continuation notice from the communication terminal device (100), and the first communication system (A) does not execute a procedure to suspend the communication terminal device (100) when it receives a transmission procedure end notice from the communication terminal device (100).

(Supplementary Note 11)

The communication system (1000) according to Supplementary note 10, wherein:

the communication terminal device (100)

executes a transmission availability determination procedure based on the access control information in response to reception of the access control information from the first communication system (A), sends a transmission procedure continuation notice to the first communication system (A) when the transmission is determined to be available, and sends a transmission procedure end notice to the first communication system (A) when the transmission is determined to be unavailable.

(Supplementary Note 12)

A communication control method executed by a communication terminal device (100) including a first communication means (101), a second communication means (102), an instruction input means (103), and a control means (109), including:

a first communication step in which the first communication means (101) performs data communication in a first communication mode specializing in packet communication via a first communication system (A);

a second communication step in which the second communication means (102) performs data communication in a second communication mode supporting voice communication via a second communication system (B);

an instruction input step in which the instruction input means (103) receives input of a voice communication start instruction; and a control step in which the control means (109) controls the first communication means (101) and the second communication means (102), wherein:

the control step includes the following steps of controlling the first communication means (101) to perform data communication via the first communication system (A) until the instruction input means (103) receives the input of a voice communication start instruction;

determining whether to perform data communication via the second communication system (B) based on access control information on the second communication system (B) in response to the input of a voice communication start instruction received by the instruction input means (103); and controlling the first communication means (101) to request the first communication system (A) to execute a suspension procedure and controlling the second communication means (102) to perform voice communication via the second communication system (B) when it is determined to perform data communication via the second communication system (B).

(Supplementary Note 13)

Programs that allow a computer to function as a first communication means (101) performing data communication in a first communication mode specializing in packet communication via a first communication system (A);

a second communication means (102) performing data communication in a second communication mode supporting voice communication via a second communication system (B);

an instruction input means (103) receiving input of a voice communication start instruction; and a control means (109) controlling the first communication means (101) and the second communication means (102), wherein:

the control means (109)

controls the first communication means (101) to perform data communication via the first communication system (A) until the instruction input means (103) receives the input of a voice communication start instruction, determines whether to perform data communication via the second communication system (B) based on access control information on the second communication system (B) in response to the input of a voice communication start instruction received by the instruction input means (103); and controls the first communication means (101) to request the first communication system (A) to execute a suspension procedure and controls the second communication means (102) to perform voice communication via the second communication system (B) when it is determined to perform data communication via the second communication system (B).

(Supplementary Note 14)

A program recording medium being a computer-readable recording medium storing programs that allow a computer to function as a first communication means (101) performing data communication in a first communication mode specializing in packet communication via a first communication system (A);

a second communication means (102) performing data communication in a second communication mode supporting voice communication via a second communication system (B);

an instruction input means (103) receiving input of a voice communication start instruction; and a control means (109) controlling the first communication means (101) and the second communication means (102), wherein:

the control means (109)

controls the first communication means (101) to perform data communication via the first communication system (A) until the instruction input means (103) receives the input of a voice communication start instruction, determines whether to perform data communication via the second communication system (B) based on access control information on the second communication system (B) in response to the input of a voice communication start instruction received by the instruction input means (103); and controls the first communication means (101) to request the first communication system (A) to execute a suspension procedure and controls the second communication means (102) to perform voice communication via the second communication system (B) when it is determined to perform data communication via the second communication system (B).

Having described and illustrated the principles of this application by reference to preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A communication terminal device comprising:
    a first communication unit performing data communication in a first communication mode specializing in packet communication via a first communication system;
    a second communication unit performing data communication in a second communication mode supporting voice communication via a second communication system;
    an instruction input unit receiving input of a voice communication start instruction; and
    a control unit controlling said first communication unit and said second communication unit, wherein:
        said control unit
        controls said first communication unit to perform data communication via said first communication system until said instruction input unit receives said input of a voice communication start instruction,
        when said instruction input unit receives said input of the voice communication start instruction,
        requests said second communication system to send access control information indicating a total or a partial restriction of an access between said communication terminal device and said second communication system,
        receives said access control information sent from said second communication system in response to said request, and
        determines not to perform data communication via said second communication system if said received access control information indicates a total restriction or a restriction of equal to or greater than a predetermined level on the access between said communication terminal device and said second communication system, and determines to perform the data communication via said second communication system if said received access control information indicates a restriction of less than the predetermined level, and
        prevents said second communication unit from performing data communication if said control unit determines not to perform data communication via said second communication system, and controls said first communication unit to request said first communication system to execute a suspension procedure and controls said second communication unit to perform voice communication via said second communication system if said control untill determines to perform data communication via said second communication system.

2. The communication terminal device according to claim 1, wherein:
    said access control information is information contained in the system information of said second communication system notified by said second communication system, and
    said control unit controls said second communication unit to receive said access control information.

3. The communication terminal device according to claim 1, wherein:
    said access control information is information contained in the system information of said second communication system notified by said first communication system, and
    said control unit controls said first communication unit to receive said access control information.

4. The communication terminal device according to claim 1, wherein said control unit acquires said access control information before said instruction input unit receives said input of a voice communication start instruction.

5. The communication terminal device according to claim 1, wherein said control unit acquires said access control information after said instruction input unit receives said input of a voice communication start instruction.

6. The communication terminal device according to claim 1, wherein:
    said access control information is information indicating the probability of access to be accepted to said second communication system, and
    said control unit determines to perform data communication via said second communication system when the probability indicated by said access control information exceeds a given threshold.

7. The communication terminal device according to claim 1, wherein:
    said access control information is information indicating whether the access to said second communication system is inhibited, and
    said control unit determines to perform data communication via said second communication system when said access control information indicates that the access to said second communication system is not inhibited.

8. The communication terminal device according to claim 1, further comprising an information presentation unit presenting information for selecting whether to perform voice communication by data communication other than data communication via said second communication system when said control unit determines not to perform data communication via said second communication system, wherein:
    said instruction input unit further receives input to specify whether to perform voice communication by data communication other than data communication via said second communication system.

9. A communication system comprising a first communication system specializing in packet communication, a second communication system supporting voice communication, and a communication terminal device performing data communication via said first communication system or said second communication system, wherein:
    said communication terminal device requests said first communication system to execute a suspension procedure before performing voice communication via said second communication system,
    said communication terminal device requests said first communication system to execute a resumption procedure after said voice communication is finished,
    said first communication system holds access control information indicating a total or a partial restriction of an access between said communication terminal device and said second communication system sent from said second communication system,
    said first communication system sends, in response to a request for sending said access control information, said access control information to said communication terminal device that has performed said request, said first communication system executes a procedure to suspend said communication terminal device, if said received access control information indicates a restriction of less than a predetermined level on the access between said communication terminal device and said second communication system, and said first communication system does not execute a procedure to suspend said communication terminal device if said received access control information indicates a total restriction or a restriction of equal to or greater than the predetermined level on the access between said communication terminal device and said second communication system.

10. The communication system according to claim 9, wherein:

said communication terminal device executes a transmission availability determination procedure based on said access control information in response to reception of said access control information from said first communication system, sends a transmission procedure continuation notice to said first communication system when the transmission is determined to be available, and sends a transmission procedure end notice to said first communication system when the transmission is determined to be unavailable.

11. A communication control method comprising:

a first communication step in which data communication in a first communication mode specializing in packet communication via a first communication system is performed;

a second communication step in which data communication in a second communication mode supporting voice communication via a second communication system is performed;

an instruction input step in which input of a voice communication start instruction is received; and a control step, wherein:

said control step comprises the following steps of:

performing data communication via said first communication system until said input of a voice communication start instruction is received in said instruction input step;

when said input of the voice communication start instruction is received in said instruction input step, requesting said second communication system to send-access control information indicating a total or a partial restriction of an access between a communication terminal device and said second communication system, receiving said access control information sent from said second communication system in response to said request, and determining not to perform data communication via said second communication system if said received access control information indicates a total restriction or a restriction of equal to or greater than a predetermined level on the access between said communication terminal device and said second communication system, and determining to perform the data communication via said second communication system if said received access control information indicates a restriction of less than the predetermined level, and preventing said second communication unit from performing data communication if it is determined not to perform data communication via said second communication system in the control step, and controlling the first communication step to request said first communication system to execute a suspension procedure and controlling said second communication step to perform voice communication via said second communication system if it is determined to perform data communication via said second communication system in the control step.

12. The communication terminal device according to claim 1, wherein:

said access control information indicates an inhibition of an access from said communication terminal device to said second communication system at a predetermined probability.

13. The communication terminal device according to claim 1, wherein:

said access control information indicates an inhibition of an access from said communication terminal device to said second communication system depending on a type of service.

14. The communication terminal device according to claim 1, wherein:

said access control information indicates an inhibition of an access from said communication terminal device to said second communication system depending on a type of said communication terminal device.

15. The communication terminal device according to claim 1, further comprising a storage for storing information that indicates the predetermined level, wherein:

the control unit changes the information that indicates the predetermined level stored in the storage in response to a user input.

16. The communication terminal device according to claim 15, wherein:

the control unit changes the predetermined level depending on a transmission destination.

* * * * *